July 3, 1962

D. LIBERMAN 3,042,673

3-HYDRAZINO-PYRIDAZINE-6-CARBOXAMIDE

Filed July 9, 1959

INVENTOR:
DAVID LIBERMAN
By
Richardson, David and Nardon
ATTYS.

United States Patent Office 3,042,673
Patented July 3, 1962

3,042,673
3-HYDRAZINO-PYRIDAZINE-6-CARBOXAMIDE
David Liberman, Paris, France, assignor to Chimie et Atomistique, Paris, France, a French body
Filed July 9, 1959, Ser. No. 826,025
Claims priority, application France July 26, 1958
1 Claim. (Cl. 260—250)

Figure 1:
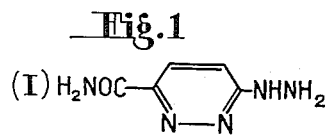

The object of the present invention is to provide a new pyridazine derivative: 3-hydrazino-pyridazine-6-carboxamide (compound I having the formula shown in FIG. 1 of the accompanying drawing) and the salts thereof formed with acids.

This compound, whose melting point is 249–250° C., is an interesting intermediate agent in the synthetic preparation of new active compounds. Moreover, it possesses in itself marked hypotensive properties which make it a valuable therapeutic agent.

Another object of the invention is to provide a process of preparing 3-hydrazino-pyridazine-6-carboxamide. This process comprises reacting hydrazine with a 3-halogeno-pyridazine-6-carboxamide.

Figure 2:
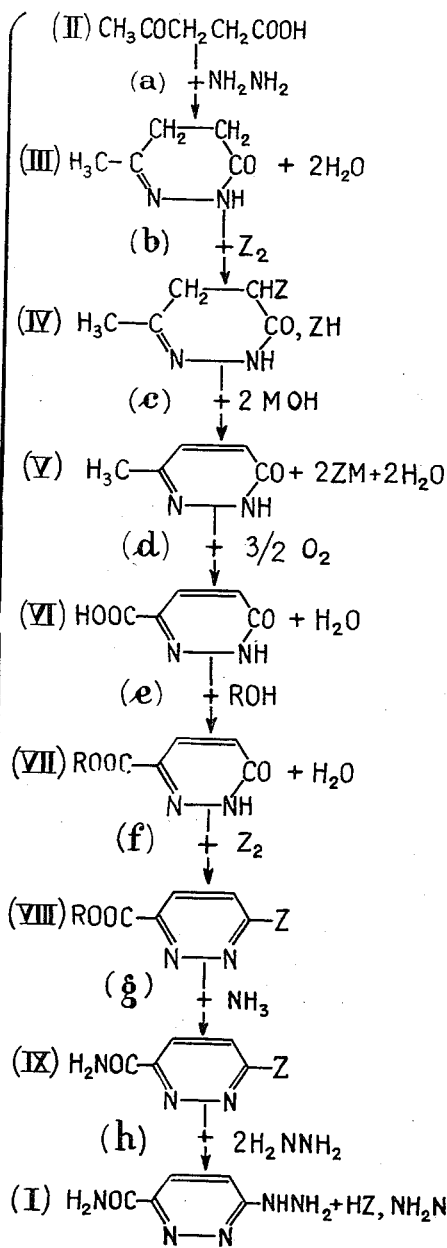

This reaction is illustrated by the stage h shown in FIG. 2 of the accompanying drawing, the 3-halogeno-pyridazine-6-carboxamide being the compound IX in which Z represents a halogen and preferably chlorine.

The hydrazine is used in the form of hydrazine hydrate and the reaction is effected by refluxing the reactants in an anhydrous solvent, such as ethyl alcohol.

The compound IX, which serves as the starting material, could itself be prepared from 3-pyridazone-6-carboxylic acid as a result of the following reactions, which is illustrated by the stages (e), (f), (g) shown in FIG. 2:

(1) Esterification of 3-pyridazone-6-carboxylic acid (VI) by an ROH alcohol, R being a hydrocarbon radical which is preferably a lower alkyl radical such as ethyl.

(2) Halogenation of the ester (VII) obtained by a halogenation agent $Z_2$, such as for example phosphorus oxychloride, thus obtaining a 3-halogeno-pyridazine-6-carboxylate (VIII).

(3) Treatment of Compound VIII by ammonia, giving the compound IX.

The synthetic preparation of 3-hydrazino-pyridazine-6-carboxamide could be, moreover, more complete; the compound VI could be itself prepared synthetically from simpler bodies. The stages (a) to (b) shown in FIG. 2 illustrate this synthetic preparation, which is carried out in the following way. Levulenic acid (II) is condensed with hydrazine, which provides 6-methyl-pyridazinone (III), the pyridazinone obtained is halogenated into 6-methyl - 4 - halogeno-3-pyridazinone (compound IV, where Z represents a halogen and preferably bromine). The halogeno-pyridazinone is dehydrohalogenated by means of an alkali MOH into 6-methyl-3-pyridazone (V), and the latter is oxidized so as to convert the 6-methyl group into a carboxylic group.

The synthetic preparation of 3-hydrazino-pyridazine-6-carboxamide from levulenic acid will be illustrated in more detail by the following example, to which the scope of the invention is in no way limited.

EXAMPLE (a) 6-Methyl-3-Pyridazinone (III)

500 g. of approximately 98% hydrazine hydrate are added in small amounts to 1 kg. of levulenic acid. The mixture is cooled and filtered after several hours, and then dried under a vacuum for about ten hours. Yield 846 g. (86%). M.P.=105° C.

(b) 6-Methyl-4-Bromo-3-Pyridazinone (IV)

400 g. of 6-methyl-pyridazinone are dissolved in 1 litre of glacial acetic acid, and there is added, drop by drop, 610 g. of bromine, cooling if necessary, so as to maintain the temperature at 40–50° C.

The mixture is agitated for a further 6 hours and left over-night. It is filtered under a hood, washed with a little acetic acid, then with ether, and dried in air.
Yield 615 g. (72%), M.P.=190–192° C.

(c) 6-Methyl-3-Pyridazone (V)

A suspension of 575 g. of the brominated derivative is maintained in 1200 cc. of water in a water bath, and a solution of 200 g. of potassium hydroxide in 300 cc. of water is added little by little. The pH is adjusted to 7 by adding the necessary amount of KOH in tablet form. The heating is continued until complete dissolution.

The mixture is evaporated until dry in a water bath and the residue is extracted with ethyl acetate.

315 g. of hydrated product are obtained, having a M.P.=124–125° C. This product is dried under a vacuum for several hours at 80–100° C. The anhydrous product melts at 145–147° C. Yield 70%.

(d) 3-Pyridazone-6-Carboxylic Acid (VI)

In a three-necked ten litre flask there are dissolved, while agitating and cooling, 200 g. of 6-methyl-3-pyridazone in 2 litres of concentrated sulphuric acid.

There are then added, in small amounts and while agitating, 536 g. of crushed potassium bichromate. When the temperature reaches 35–40° C., the mixture is cooled with iced water and maintained below 40° C. The mixture is agitated 6–7 hours, left over-night and then slowly poured onto 7 kg. of crushed ice. It is filtered after 2 hours, washed with small amounts of iced water until the product is white, and then with alcohol and with ether and dried.

Yield: 190 g. (75%) of white powder. M.P.=256–257° C. (dec.).

(e) Ethyl 3-Pyridazone-6-Carboxylate (VII)

There are refluxed for 14 hours 105 g. of 3-pyridazone-6-carboxylic acid with 550 cc. of absolute alcohol and 150 cc. of 20% hydrochloric alcohol. If everything does not dissolve, a little more hydrochloric alcohol is added. The mixture is left to cool over-night and then filtered. Yield: 90 g. (72%) of ester. M.P.=129–130° C.

(f) Ethyl 3-Chloro-Pyridazine-6-Carboxylate (VIII)

150 g. of ethyl 3-pyridazone carboxylate are dissolved at 120° C. in 1000 cc. of $POCl_3$. The mixture is refluxed for 30 minutes, allowed to cool at 70° C. and distilled under a vacuum of 15 to 20 mm. of Hg. The cooled residue is removed from the flask in several stages by a mixture of crushed ice and a saturated solution of $CO_3Na_2$. The deposit is crushed in a mortar in the presence of a solution of $CO_3N_2$, it is filtered, washed with a little water and dried in air. The dark product is crystallized in boiling water with discolouring charcoal. Yield: 140 g. (34%) of bluish, mother-of-pearl flakes. M.P.=152–153° C.

(g) 3-Chloro-Pyridazine-6-Carboxyamide (IX)

140 g. of ethyl 3-chloro-pyridazine-6-carboxylate are put in suspension in 560 cc. of absolute alcohol saturated by ammonia. A stream of $NH_3$ is passed therethrough for 2 hours. The mixture is left over-night in an ice box. It is filtered, washed with a little alcohol, and then with ether, and dried at 80° C.
Yield 115 g. (98%). M.P.=249° C.

(h) 3-Hydrazino-Pyridazine-6-Carboxamide (I)

105 g. of carboxamide are added to a solution of 70 g.

of hydrazine hydrate in 1 litre of absolute alcohol. The mixture is refluxed for exactly 30 minutes. It is cooled and then filtered. The insoluble part is boiled for 15 minutes with 800 cc. of water. The mixture is filtered while boiling, the insoluble part is washed with 100 cc. of boiling water, and then put in contact with 200 cc. of boiling water for 5 minutes. Yield: 58 g. (56%). M.P.=249–250° C.

3-hydrazino-pyridazine-6-carboxamide gives with the acid salts among which may be mentioned for example hydrohalides, tartrates, maleates, citrates, sulphates.

The scope of the invention is not limited to the modes of carrying out the invention, which have been given merely by way of examples.

Having now described my invention what I claim as new and desire to secure by Letters Patent is:

A member selected from the group consisting of: 3-hydrazino-pyridazine-6-carboxamide having the formula:

and the therapeutically administrable acid addition salts thereof.

References Cited in the file of this patent

UNITED STATES PATENTS 2,484,029     Hartmann et al. _____ Oct. 11, 1949

FOREIGN PATENTS 788,502     Great Britain _____ Jan. 2, 1958

OTHER REFERENCES

Taylor et al.: Organic Chemistry of Nitrogen (Revised Edition, 1942), page 398.

Morton: Levulenic Acid as a Source of Heterocyclic Compounds, Scientific Report Series No. 8 (Sugar Research Foundation, Inc., N.Y., August 1947).

Overend et al.: J. Chem. Soc., London (1947), pp. 239–44.

Homer et al.: J. Chem. Soc, London (1948), pp. 2191–9.